United States Patent [19]

Schram

[11] Patent Number: 4,966,185

[45] Date of Patent: Oct. 30, 1990

[54] INFLATABLE BODY WITH A VALVE AND A PACKAGING WITH SUCH A BODY

[76] Inventor: Henk Schram, Zuideinde 161, 1551 EE Westzaan, Netherlands

[21] Appl. No.: 294,118

[22] Filed: Jan. 6, 1989

[30] Foreign Application Priority Data

Jan. 6, 1988 [NL] Netherlands .................... 8800020

[51] Int. Cl.⁵ ............................................. F16K 15/14
[52] U.S. Cl. .................................... 137/223; 137/859
[58] Field of Search ................................ 137/223, 859

[56] References Cited

U.S. PATENT DOCUMENTS

| | | | |
|---|---|---|---|
| 886,316 | 4/1908 | Dunn ............................ | 137/223 X |
| 2,355,862 | 8/1944 | Harper .......................... | 137/859 X |
| 2,497,906 | 2/1950 | Peters ........................... | 137/859 X |
| 3,807,430 | 4/1974 | Keller ........................... | 137/859 X |
| 4,146,069 | 3/1979 | Angarola ...................... | 137/223 X |
| 4,712,583 | 12/1987 | Pelmulder ..................... | 137/859 X |

FOREIGN PATENT DOCUMENTS

| | | | |
|---|---|---|---|
| 51118 | 10/1941 | Netherlands .................... | 137/223 |
| 639593 | 6/1950 | United Kingdom . | |
| 860269 | 2/1961 | United Kingdom ............ | 137/223 |

Primary Examiner—Robert G. Nilson

[57] ABSTRACT

A valve for an orifice in an inflatable body includes an outer plate which has a central gas passage and is attached to the outside of the body and extend across the orifice, an inner plate which defines a bore hole therein and is attached to the inside of the body around the orifice, a central valve body portion within the bore hole and attached to the inner plate by wings which define gas inlets therebetween, and a sealing ring positioned between the central valve body portion and the outer plate so as to close the central gas passage in the outer plate.

6 Claims, 4 Drawing Sheets

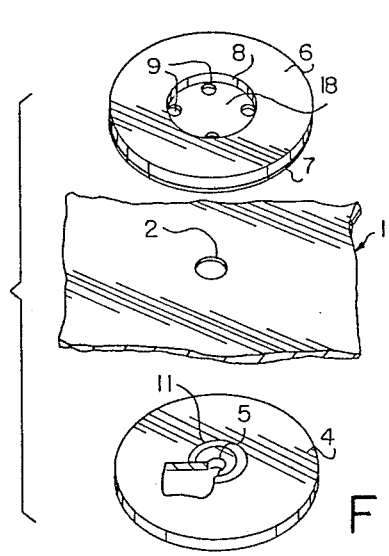
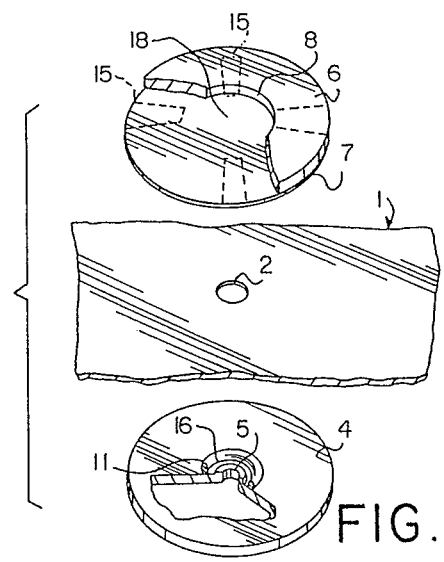
FIG. 1
FIG. 3
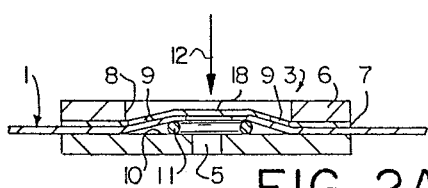
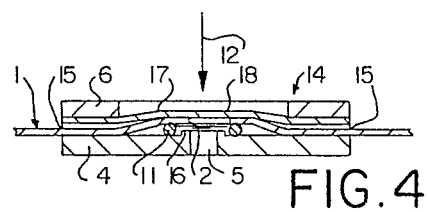
FIG. 2A
FIG. 4A
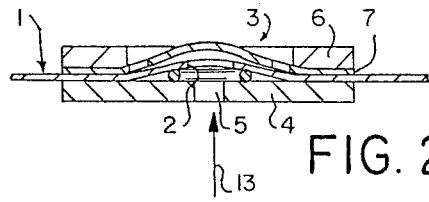
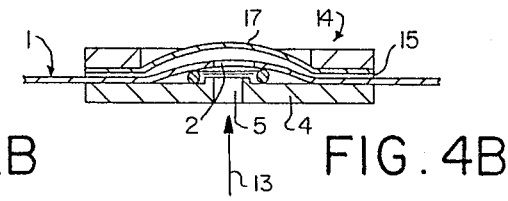
FIG. 2B
FIG. 4B
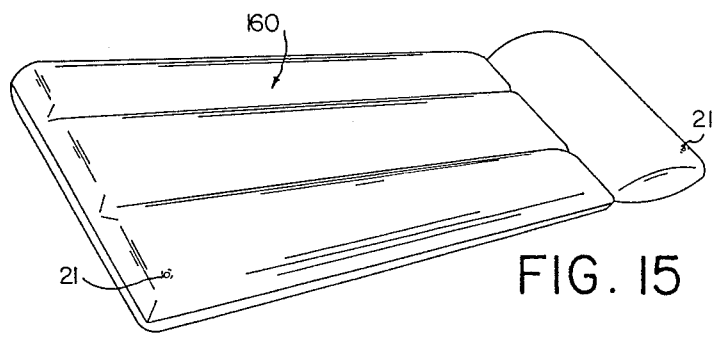
FIG. 15

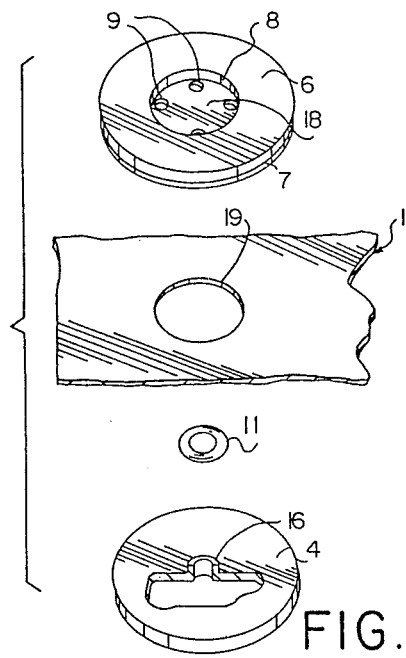
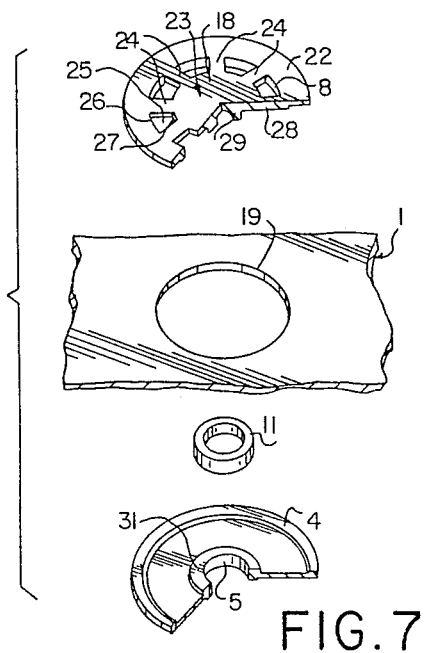
FIG.5  FIG.7
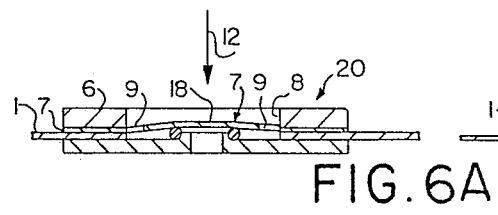
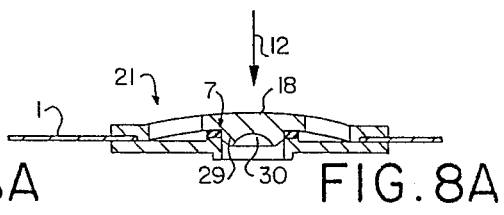
FIG.6A  FIG.8A
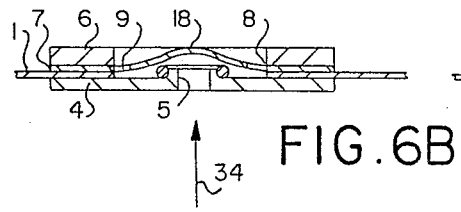
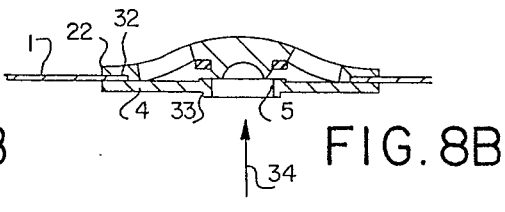
FIG.6B  FIG.8B

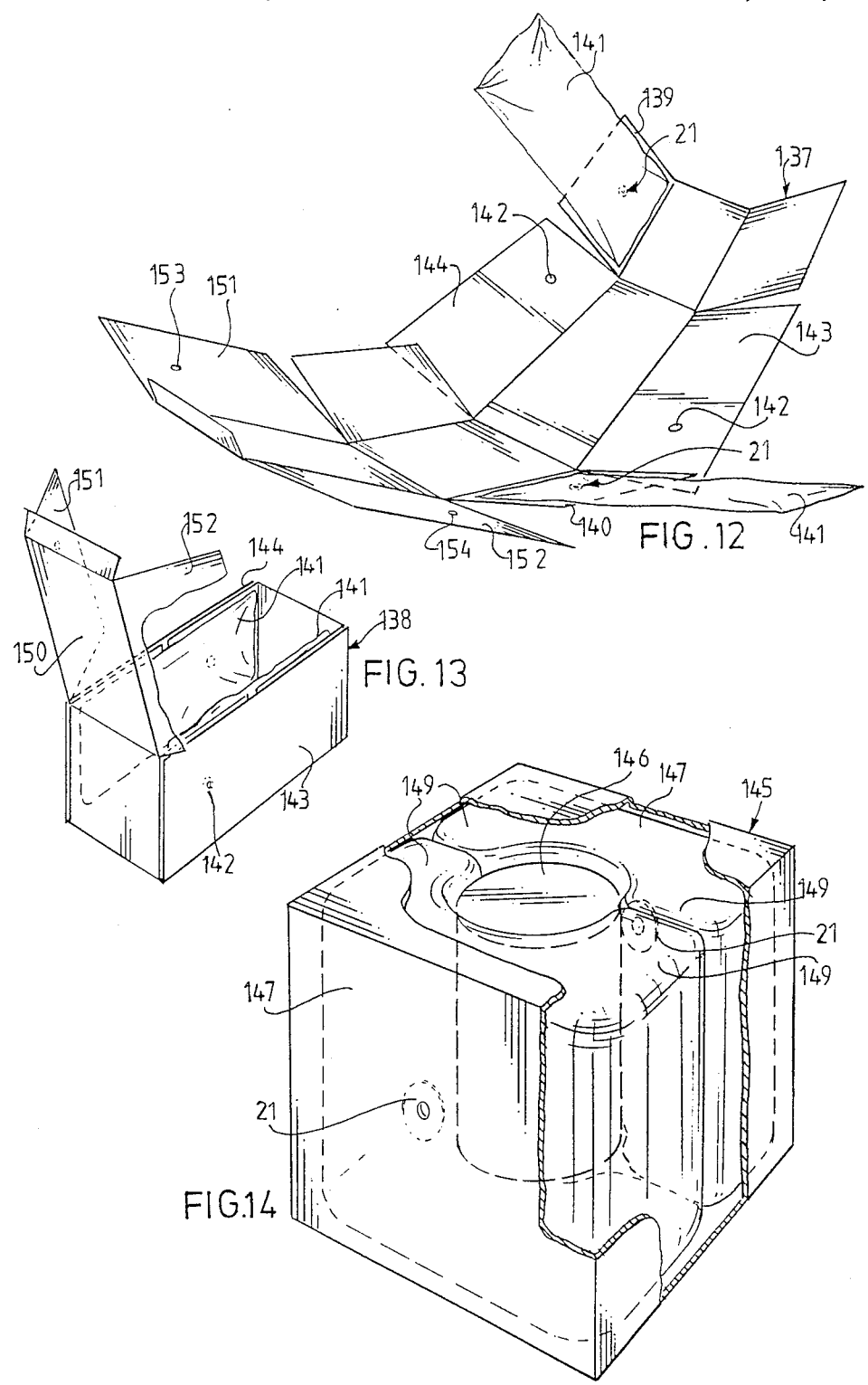

INFLATABLE BODY WITH A VALVE AND A PACKAGING WITH SUCH A BODY

The present invention relates to a gas-inflatable body provided with an opening that can be closed off with a valve.

U.S. Pat. No. 1,702,981 describes a body with a valve of which the rubber internal plate is inset with a rigid metal disc. This metal disc is provided with upright gas inlets which, after inflation of the body, lie sealingly against the inner surface of the body, which is reinforced on the outside with a rubber exterior plate.

This known valve construction has a number of drawbacks. Because the gas inlets co-act sealingly with the inner surface of the body, only specific, mainly resilient compressible materials are used. In addition, a comparatively large overpressure is necessary in the body to ensure adequate sealing, because the inner surface is tensioned over the gas inlets for the first time in the inflated state.

This invention has for its object to provide a valve for an inflatable body which substantially does not possess the above-stated drawbacks and where the choice of the material properties of the body is only dependent on the requirements for the arranging of an adequate connection between the body on the one hand and the valve components on the other. Moreover, an overpressure in the order of only a tenth bar or less is sufficient for realizing of a well sealing valve.

This is achieved according to the invention in that a gas-inflatable body is provided with a valve according to the invention, which comprises:

- an outer plate with a gas passage which is arranged on the body around the opening such that the gas passage lies opposite the opening;
- a flat inner plate provided with a bore-hole and arranged on the interior of the body with the bore-hole over the opening;
- a flat valve body located between the outer plate and the inner plate and having a central valve body portion with which the gas passage in the outer plate can be closed off, and having at least one gas inlet located outside the central valve body portion and inside the gas passage; and
- a resilient sealing located around the gas passage between the flat valve body and the flat inner plate, on which sealing the valve body rests bent and tensioned—with the valve in closed position—with its central valve body portion.

U.S. Pat. No. 1,910,961 describes an air valve, the outer plate of which is furnished with nipples connecting onto either side of the gas passage. The body is tensioned over the inner nipple, whereby the opening lies in the body next to but beneath the outer plate. This known valve has the further drawback that because of the protruding valve body and as a consequence of a relative displacement the valve can be opened in undesired manner.

In order to ensure that the valve seals at a minimal internal pressure the resilient sealing forms on the outer plate an elevation on which the flat valve body rests in bent and tensioned state when the inner and outer plates are attached to the body as it is enclosed.

If the surface area of the opening in the body is equal to or greater than the surface area of the bore-hole in the inner plate, the resilient, upright sealing forms the only contact between the inner and outer plates.

In accordance with a very favourable embodiment the flat valve body is integrated into the flat inner plate and they form together one entity, whereby via wings extending laterally from the valve body they are joined to one another, whereby adjoining wings together with relevant edge parts of the valve body and of the bore-hole define a gas inlet.

In order to ensure the most uniform possible distribution of forces over the sealing it is recommended that the wings are arranged diametrically and in rotation symmetry around the central valve body portion.

An optimum valve action is obtained if more preferably the central valve body portion is provided—in the closed position of the valve—with a valve body guiding extending into the gas passage.

The valve according to the invention can be operated from outside for deflating of the body if the valve body is also preferably furnished with a tool seating for a tool accessible via the gas passage, with which tool the valve body can be lifted from the outer ring. This avoids stretching and even piercing of the valve body.

According to another preferred embodiment the flat valve body is a resilient valve foil lying between the inner plate and the body, whereby in preference the gas inlets are either located between the valve foil and the body or arranged in the valve foil. For a uniform distribution of forces it is recommended that the number of gas inlets amounts to between 3 and 6. The minimum number of gas inlets is for instance 3, mutually arranged at an angle of 120°. More preferable are 4 gas inlets at a mutual angle of 90°. In the case of more than 6 gas inlets the drawback arises that the valve foil is weakened by the gas inlets arranged therein. When there are fewer than 3 gas inlets, for instance 2, there is the drawback that folds can form on the annular elevation around the central vertical plane between the gas inlets.

The air-inflatable body according to the invention has a particular application in a packaging for packing of fragile articles, so that the valve is preferably incorporated in the packaging wall and the outer wall could thereby optionally form a component of a packaging wall.

If the body around an article has protective shielding body portions, the best possible enclosure on all sides of the article for packaging is realized.

If the body is provided with concertina-shaped body portions articles of different dimensions can then be optimally enclosed.

Mentioned and other features of the inflatable body according to the invention will be described hereinafter on the basis of a number of embodiments, to which the invention is not limited, while reference is made to the annexed drawing.

BRIEF DESCRIPTION OF THE PREFERRED EMBODIMENTS

FIG. 1 is an exploded view of a valve according to the invention;

FIGS. 2A and 2B are sections through the valve from FIG. 1 arranged in a body after inflation (FIG. 2A) and during inflation (FIG. 2B);

Figure 9:
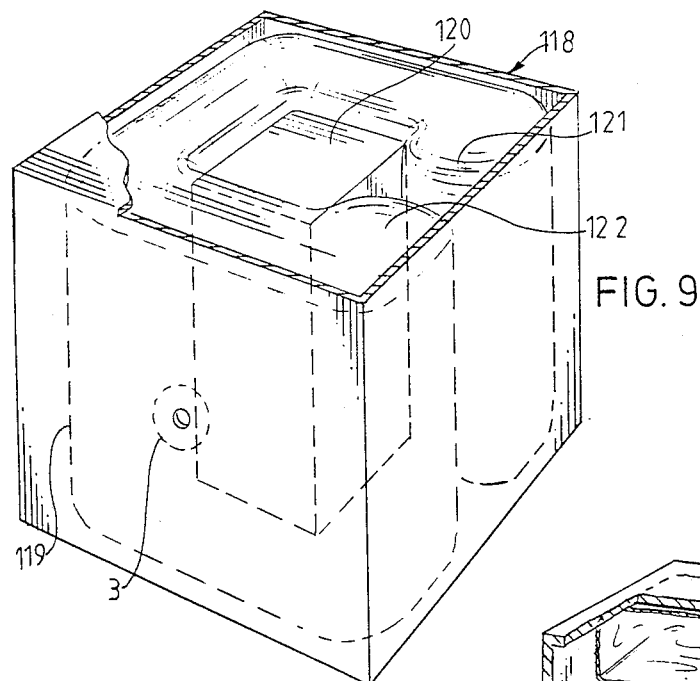

FIGS. 3, 5 and 7 and FIGS. 4A, 4B, 6A, 6B, 8A and 8B each show views corresponding to FIG. 1 and FIG. 2 respectively of other embodiments of the valve according to the invention;

FIGS. 9, 10, 11 and 14 each show a view of a packaging in which is incorporated an inflatable body according to the invention;

FIG. 12 shows a packaging plano having two inflatable bodies according to the invention;

FIG. 13 is a packaging assembled from the packaging plano as in FIG. 12; and

FIG. 15 shows another form of use of the inflatable body as a life-saving means.

DETAILED DESCRIPTION OF THE PREFERRED EMBODIMENTS

FIGS. 1 and 2 show an inflatable body 1 provided with an opening 2 which can be closed with a valve 3. Valve 3 comprises an outer plate 4 that is arranged around opening 2 such that a gas passage 5 lies opposite opening 2. The outer plate 4 is adhered to the body 1 for example with adhesive or by means of welding.

Adhered on the inside to the body 1 is an inner plate 6 together with a valve foil 7 as valve body. The inner plate 6 has a central hole 8 which encircles gas inlets 9 arranged in the valve foil 7.

At a small internal overpressure (FIG. 2A) the valve foil 7 presses with a central valve body portion onto a sealing ring 11 located on the surface 10 of outer plate 4, while between them the body 1 with the opening 2 is enclosed and the gas passage 5 thus obstructed. As a result of the internal gas pressure (arrow 12) the bent and tensioned valve foil 7 is pressed against the body 1 and the gas inlets 9 are thereby also blocked.

When the body 1 is inflated the gas flow (arrow 13) will lift the valve foil 7 from the ring 11, with the result that gas can pass through towards the interior of body 1 via the opening 2 and the gas inlets 9 arranged around it in rotation symmetry in the valve foil 7.

In the variant shown in FIGS. 3, 4A and 4B corresponding construction components are designated with the same reference numerals. The valve 14 is in this case provided with gas inlets 15 consisting of radial intervals in the adhesion between the body 1 and the valve foil 17. An annular positioning edge 16 for the sealing ring 11 further forms an entity with the outer plate 4 and they are formed in one common injection moulding operation. In this case gas passes during inflation (FIG. 4B) via the gas passage 5, the opening 2 and through the gas inlets 15 between the body 1 and the valve foil 17 through to the interior of body 1. It is particularly noted that this valve foil is not furnished with gas inlets 9.

FIGS. 5 and 6 show the valve 20 according to the invention which is a variant of the valve 14 from FIGS. 3 and 4. In this case the surface area of the opening 19 in body 1 is substantially equal to the surface area of the bore-hole 8 in the inner plate 6. As a result the valve body 7 in the form of valve foil directly co-acts with its central valve body portion 18 with the sealing ring 11. Thus realized is a sealing that is completely independent of the material properties of body 1. The material properties of the valve foil 7 can be optimally selected in order to obtain, in the case of a closed valve 20, a sure sealing with the valve foil 7 bent and tensioned over the sealing ring 11, even when the internal overpressure is very small.

FIGS. 7, 8A and 8B show another valve 21 according to the invention, whereby the flat inner plate 22 and the flat valve body 23 form one whole. Inner plate 22 and valve body 23 lie in one plane and are joined to one another via wings 24 extending laterally from the valve body 23. Together with an edge part 26 of the bore-hole 8 and an edge part 27 of the valve body the wings 24 form a gas inlet 25. The wings 24 are arranged diametrically and in rotation symmetry around the central valve body portion 18 which is provided on its side 28 facing the outer plate 4 with a guiding member 29 which can extend into the gas passage 5 in the outer plate 4. The guiding member 29 is further provided with a tool seating 30 so that, if required, the valve body 7 can be lifted and the inflated body 1 can be deflated.

The flat sealing ring 11 is attached for clamping around the guiding member 29 and co-acts with an annular rim 31 around the gas passage 5, which results in the integrated inner plate/valve body lying in a still more bent and tensioned position when the valve 21 is closed.

The body 1 lies in a peripheral groove 32 of the inner plate 22 and is adhered in position there to inner plate 22 and outer plate 4, these latter being possibly adhered to one another if required.

Finally, a spigot edge 33 of outer plate 4 is intended for placing thereover of a feed hose for air 34 with which the body 1 can be inflated.

FIG. 9 shows a packaging 118 having therein a gas-inflated body 119 provided with a valve according to the invention. This body 119 encloses a fragile article 120 and possesses for this purpose body portions 121 and 122 forming a protective shield around the article 120.

Figure 10:
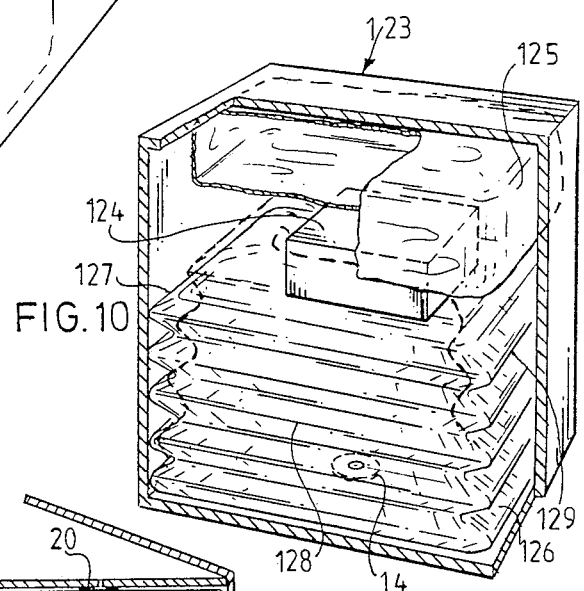

FIG. 10 shows a packaging 123 in which a fragile article is clamped in between a known air bag 125 on one side and a gas-inflated body 126 provided with a valve 14 according to the invention on the other. An article 124 can be packaged in adequate manner in the packaging 123 and be wedged in between the air bag and the body 126 since the body 126 is provided with concertina-like side edges 127–129.

Figure 11:
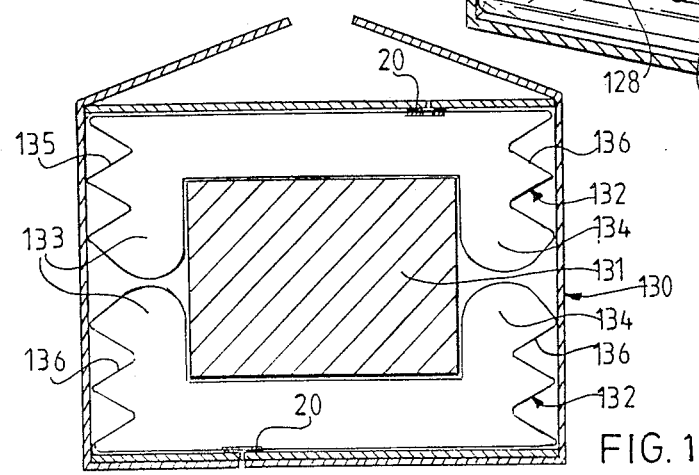

FIG. 11 shows a packaging 130 in which a fragile article 131 is accommodated between two indentical gas-inflated bodies 132 provided with a valve 20, each of which possesses body portions 133 and 134 forming a protective shield around the article 131 as well as concertina-like side edges 135 and 136.

FIG. 12 shows in curved form a plano 137 for the packaging 138 shown in FIG. 13. The plano 137 is furnished on two side flaps 139 and 140 with a gas-inflatable body 141 according to the invention which is provided with a valve 21. After shaping of the packaging 138 from the plano 137, an object can be wedged in between both the bodies 141 by feeding gas via the valve into both bodies 141 by way of a hole 142 in the side surfaces 143 and 144. The packaging 138 is subsequently closed with the cover 150, whereby the cover flaps 151 and 152 come to lie between the side surfaces 143, 144 on the one side and the flaps 139 and 140 on the other, whereby the valves 21 remain accessible from outside via the holes 153 and 154. Additional air can thus be pumped in if required.

FIG. 14 shows a packaging 145 in which a fragile article 146 is clamped in between two gas inflated bodies 147 which are provided with a valve 21 according to the invention and which with the body portions 149 form a protective shield around the fragile article 146.

Finally, FIG. 15 shows an inflated body 160 that is provided with a valve 21 according to the invention and which can for instance be used for camping, life-saving and medicinal purposes.

The gas with which the body according to the invention is inflated is preferably air and the body preferably consists of a reasonably gas-tight material, for example polyethene foil. The valve foil may also be made from this material. In addition, rigid plastic is preferably used for the inner and outer plates and optionally for the valve body integrated into them. Most important however is that the bent valve body tensioned on the sealing must close off the opening in the body at a relatively low internal overpressure, and further that gas can easily be supplied via the valve.

I claim:

1. The combination of a gas-inflatable body which has an orifice and an inner surface and an outer surface, and a valve for opening and closing the orifice, said valve comprising:

an outer plate which has a central gas passage therein and a rim, the outer plate extending across the orifice in said body and being in sealing contact with the outer surface of said body, an inner plate which defines a central hole and is in sealing contact with the inner surface of said body around said orifice, a central valve body portion within said central hole and connected to said inner plate by a plurality of wings which define a plurality of gas inlets, and a sealing ring positioned between the central valve body portion and the central gas passage of the outer plate for sealing closed the central gas passage in the outer plate when the inner plate is moved towards the outer plate, while movement of the central valve body portion away from the outer plate enabling a flow of gas to pass through the central gas passage and the gas inlets.

2. The combination of claim 1, wherein the central valve body portion includes an annular guide member which extends towards said outer plate and around which the sealing ring is positioned.

3. The combination of claim 2, wherein a tool seating is provided within the annular guide member.

4. The combination of claim 2, wherein said outer plate includes an annular spigot edge around said gas passage that extends in a direction away from said central valve body portion.

5. The combination of claim 1, wherein the wings are equally diametrically arranged.

6. The combination of claim 1, wherein the gas-inflatable body includes concertina-shaped sections.

* * * * *